United States Patent [19]

Chang

[11] Patent Number: 5,426,996

[45] Date of Patent: Jun. 27, 1995

[54] FIXING DEVICE FOR SECURING A HANDLEBAR STEM OF A BICYCLE

[75] Inventor: Robert Chang, Taichung Hsien, Taiwan

[73] Assignee: Kalloy Industrial Company, Ltd., Taichung Hsien, Taiwan

[21] Appl. No.: 194,264

[22] Filed: Feb. 10, 1994

[51] Int. Cl.6 .......................... B62K 21/12; F16D 1/06
[52] U.S. Cl. ................................. 74/551.1; 280/279; 403/24; 403/191; 403/290; 403/344
[58] Field of Search ..................... 74/551.1, 551.2; 280/279, 278; 403/24, 191, 290, 344

[56] References Cited

U.S. PATENT DOCUMENTS

| | | | |
|---|---|---|---|
| 570,309 | 10/1896 | Johnson | 403/290 |
| 4,718,789 | 1/1988 | Kuenen | 403/191 X |
| 5,028,161 | 7/1991 | Peleg | 403/191 X |
| 5,095,770 | 3/1992 | Rader | 74/551.1 |
| 5,183,352 | 2/1993 | Carpenter | 403/24 X |
| 5,190,346 | 3/1993 | Ringle | 403/24 X |
| 5,193,930 | 3/1993 | Chi | 403/290 X |
| 5,201,242 | 4/1993 | Chi | 74/551.1 |
| 5,228,796 | 7/1993 | Kao | 403/24 X |
| 5,297,445 | 3/1994 | Chen | 74/551.1 X |
| 5,301,570 | 4/1994 | Li | 74/551.1 |

Primary Examiner—Vinh T. Luong
Attorney, Agent, or Firm—Bacon & Thomas

[57] ABSTRACT

A fixing device for securing a handlebar stem of a bicycle includes a handlebar stem having vertical and level portions. The level portion has a receiving element formed on a free end thereof for securing a handlebar therein, the vertical portion having a scroll-like tube with one end thereof overlapping the other to form an inner part and an outer part. An opening is formed in the outer part and a first lug is formed on an edge of the opening and a second lug is formed on inner part and extends outwardly through the opening, such that the tube securing an upper end of a front fork by screwing a bolt therethrough.

2 Claims, 3 Drawing Sheets

FIXING DEVICE FOR SECURING A HANDLEBAR STEM OF A BICYCLE

BACKGROUND OF THE INVENTION

The present invention relates to a fixing device for securing a handlebar stem of a bicycle, and more particularly to a scroll-like cylindrical tube with two lugs formed on the handlebar stem for securely engaging to a front fork of the bicycle.

A conventional fixing device for securing handlebar stem is disclosed in U.S. Pat. No. 4,274,301 to Katayama, issued Jun. 23, 1981, entitled "HANDLE STEM FIXING DEVICE FOR A BICYCLE AND THE LIKE". In this patent, a cone 3 is threadedly engaged on a lower end of a bolt 2 and caused to move radially outwards to fix the handle stem 5. In this design, an opening should be provided in an upper end of the handle stem 5 and the head 21 of the bolt 2 should be exposed such that the bolt 2 can be rotated. However, such an arrangement has a drawback for the parts received therein tend to be rusted by entry of water and dust.

The present invention intends to mitigate and/or obviate the above mentioned problems.

SUMMARY OF THE INVENTION

The present invention provides a fixing device for securing a handlebar stem of a bicycle, and which includes a handlebar stem having vertical and level portions. The vertical portion has a scroll-like tube with one end thereof overlapping the other to form an inner part and an outer part. An opening is formed in the outer part and a first lug is formed on an edge of the opening and a second lug is formed on inner part and extends outwardly through the opening, such that the tube securing an upper end of a front fork by screwing a bolt therethrough.

Other objects, advantages, and novel features of the invention will become more apparent from the following detailed description when taken in conjunction with the accompanying drawings.

DETAILED DESCRIPTION OF THE PREFERRED EMBODIMENTS

Figure 1:
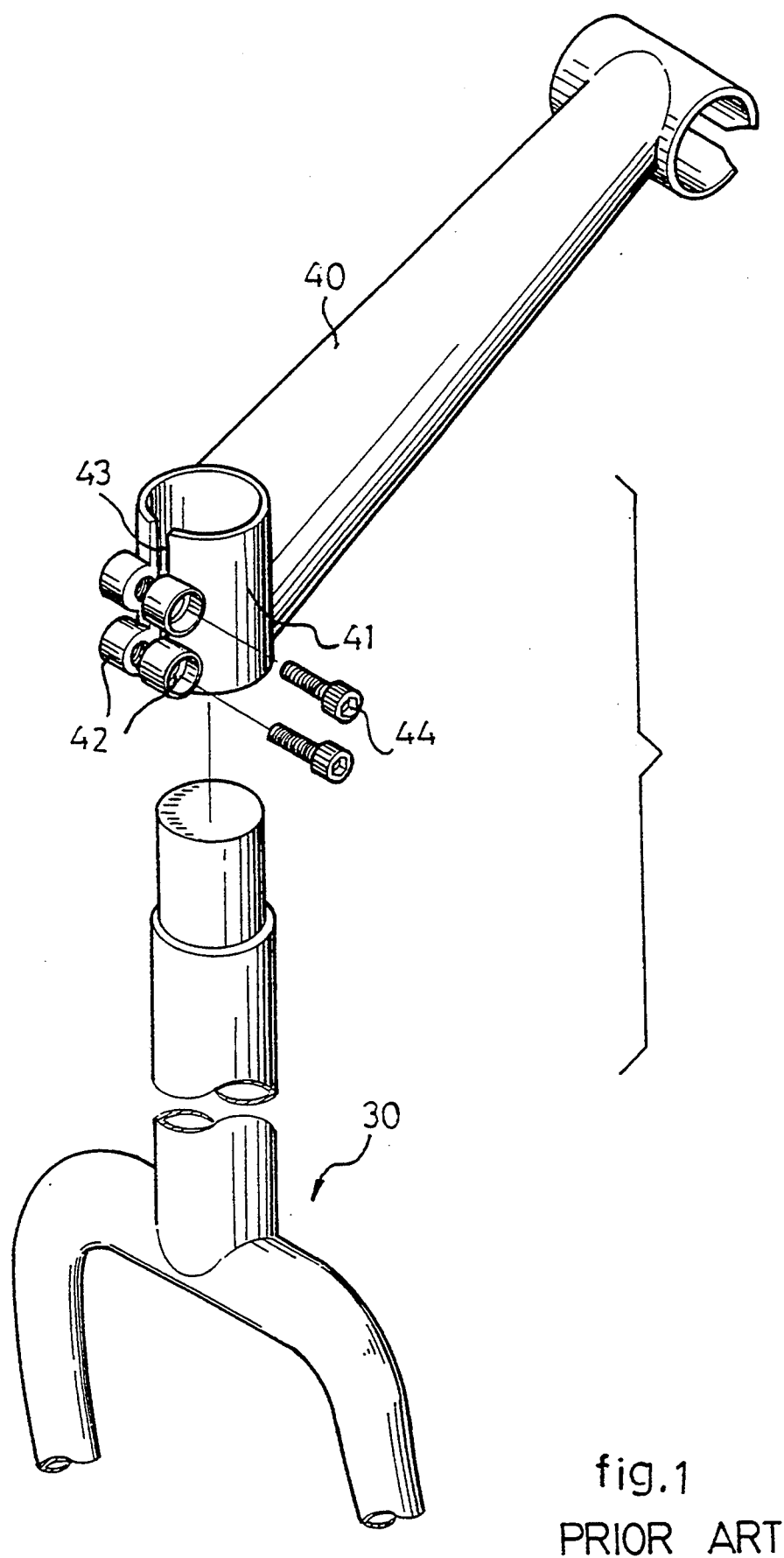
FIG. 1 is a explosive view of a conventional fixing device for securing a handlebar stem.

Referring to FIG. 1, another kind of fixing device for securing a handlebar stem of a bicycle, and which comprises a tube 41 engaged on an upper end of a front fork 30, a level portion 40 having a first end fixed on the tube 41 and having a second end for engaging with a handlebar (not shown), the tube 41 includes a slot 43 vertically formed therein and a pair of lugs 42 being formed on opposite edges adjacent the slot 43 and which can be fixed by two bolts 44 extending therethrough. The lugs 42 and the bolts 44 are exposed and are apt to be rusted.

Figure 2:
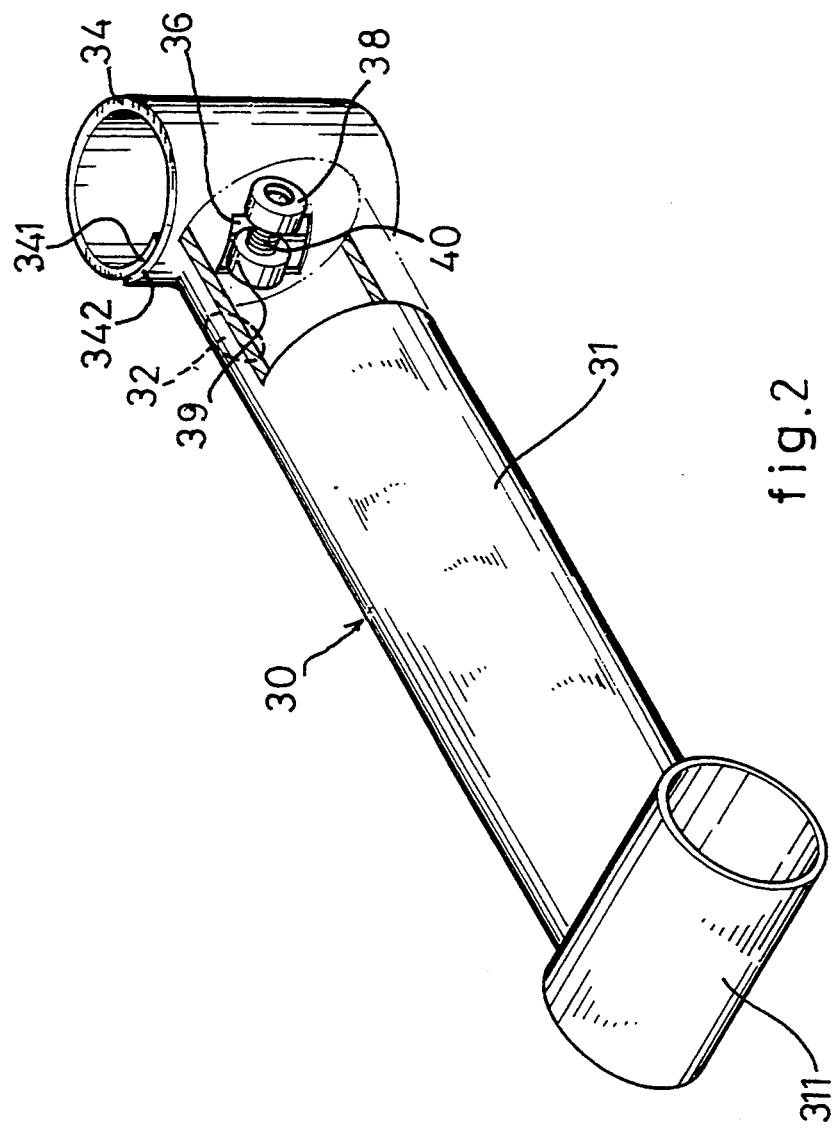
FIG. 2 is a perspective view, partly in section, of a fixing device for securing a handlebar stem of a bicycle in accordance with the present invention.
Figure 3:
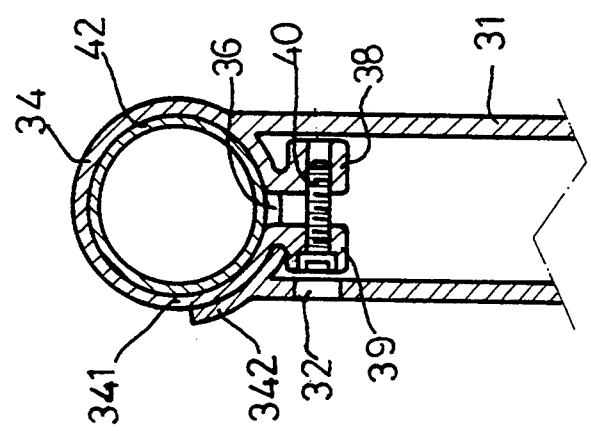
FIG. 3 is a top elevational view, partly in section, of the device in accordance with the present invention.

Referring now to FIGS. 2 and 3, a fixing device for securing a handlebar stem of a bicycle in accordance with the present invention includes a handlebar stem 30 which has vertical and level portions 31, the level portion 31 having a receiving element 311 formed on a free end thereof for securing a handlebar (not shown) therein and the vertical portion having a scroll-like tube 34 with one end thereof overlapping the other to form an inner part 341 and an outer part 342. An opening 36 is formed in the outer part 342 and a first lug 38 is formed on an edge of the opening 36, a second lug 39 is formed on the inner part 341 and extends outwardly through the opening 36, such that an inner diameter of the tube 34 will be reduced by threading a bolt 40 through the first and second lugs 38, 39. An access opening 32 is formed in the lever portion for the purpose of extending a appropriate tool therethrough to screw the bolt 40.

The tube 34 is mounted on an upper end 42 of a front fork which is similar to that shown in FIG. 1, and a bolt 40 is then screwed through the two lugs 38, 39 by a tool extending through the access opening 32 to make the two lugs 38, 39 closer, such that the inner and outer parts 341, 342 of the tube 34 will be scrolled and reduce the inner diameter of the tube to securely mount on the upper end 42 of the front fork.

Accordingly, the lugs 38, 39 and the bolt 40 are well shield in the level 31 so as to avoid from entry of dust and water. Further, the engaging portion of the front fork and the tube 34 has a smooth outer appearance which satisfies an aesthetic requirement.

Although the invention has been explained in relation to its preferred embodiment, it is to be understood that many other possible modifications and variations can be made without departing from the spirit and scope of the invention as hereinafter claimed.

I claim:

1. A fixing device for securing a handlebar stem of a bicycle comprising a handlebar stem having vertical and level portions, said level portion having a receiving element formed on a free end thereof for securing a handlebar therein; said vertical portion having a scroll-like tube with one end thereof overlapping the other to form an inner part and an outer part, an opening being formed in said outer part and a first lug being formed on an edge of said opening, a second lug being, formed on said inner part and extending outwardly through said opening, said tube securing an upper end of a front fork by screwing a bolt through said first and second lugs.

2. The device as claimed in claim 1 wherein an access opening being formed in said level portion and which corresponding to one of said lugs for a tool extending therethrough.

* * * * *